Figure 3:
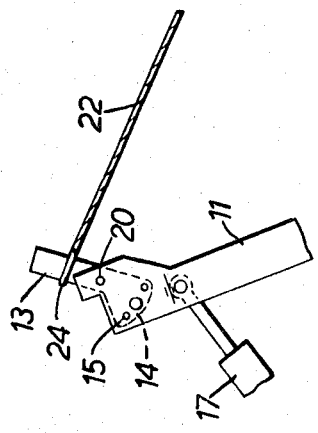

United States Patent

Farrant

[15] 3,679,230
[45] July 25, 1972

[54] SYSTEMS FOR DRAWING TRAILERS BEHIND TRACTORS

[72] Inventor: David J. Farrant, Welshes Farm, Clatworthy, Wiveliscombe, Somerset, England

[22] Filed: Dec. 11, 1969

[21] Appl. No.: 884,386

[52] U.S. Cl. ................... 280/405 B, 280/479 A, 280/411 A, 172/7
[51] Int. Cl. ......................................................B62d 53/00
[58] Field of Search ................... 280/405, 406, 405 B, 150 E; 172/7

[56] References Cited

UNITED STATES PATENTS

| 3,032,352 | 5/1962 | Barrett | 280/150 E |
| 3,463,510 | 8/1969 | Van Syoc | 280/405 B |
| 3,480,294 | 11/1969 | Lichti | 280/405 |
| 3,485,511 | 12/1969 | Gale | 280/405 B |
| 3,517,943 | 6/1970 | Bunting et al. | 280/405 B |
| 3,565,458 | 2/1971 | Bettin | 280/405 B |

FOREIGN PATENTS OR APPLICATIONS

| 1,071,252 | 6/1967 | Great Britain | 172/7 |

*Primary Examiner*—Leo Friaglia
*Attorney*—Watson, Cole, Grindle & Watson

[57] ABSTRACT

This invention is an attachment device enabling the rear wheels of a tractor to be loaded to increase the tractive effort by the tension in a chain connected between the trailer and a post on the attachment, a hydraulic actuator being arranged to move the attachment to tension the chain to supply the additional load to the rear wheels of the tractor.

10 Claims, 3 Drawing Figures

PATENTED JUL 25 1972　　3,679,230

INVENTOR
DAVID J. FARRANT
BY
Watson, Cole, Grindle & Watson
ATTORNEY

SYSTEMS FOR DRAWING TRAILERS BEHIND TRACTORS

This invention is a system for drawing trailed implements behind tractors and one object is to provide an attachment enabling load to be applied to the back axle to increase the tractive effort of the tractor.

According to the present invention, an attachment for coupling a trailer to a tractor includes a bracket for coupling to the trailer and an actuator arranged to move the bracket to cause the weight of the trailer to apply an increased load to the rear axle of the tractor.

In one form of the invention the bracket is an upstanding bracket in the form of an inverted Y with the ends of the forks pivotally connected to the lower take-off points to the standard tractor three point attachment and with the actuator coupled to it near its upper end which has a post for a ring coupling for connection through a chain with the trailer. The actuator effectively replaces the upper link of the standard three-point attachment, and the effect is that by using the tractor hydraulic system to contract the actuator the chain can be tensioned tending to lift the front of the trailer, and indeed the front wheels of the tractor can be lifted by the tension in the chain. Also the trailer tends to be moved a little nearer the tractor. The cumulative effect is to increase the vertical load on the rear axle which is the driving axle so that the tractive effort is substantially increased. In fact additional load can be applied to the front of the tractor to keep the front wheels just in contact with the ground for steering and of course this additional load is also applied to the rear axle.

The effect is achieved by spacing the connection points on the chain radially from the rear axle and this has the additional advantage that the chain is held clear of the rear power take-off point from the tractor so that that is available for driving mechanism on the implements being trailed.

The invention has particular application to a tractor with two-wheel drive since it enables a simple adaptor to be fitted to give a two-wheel drive tractor amost as good tractive effort as a much more expensive four-wheel drive tractor.

Also the attachment assists in the pulling of two or three implements side by side since a transverse yoke can be coupled to the chain a little to the rear of the ring and attachment points for chains to the different implements can be spaced along the yoke. This tends to balance the forces in the chains so that the ganged implements can be turned at the end of a line.

Also the chain and ring on the bracket can be used for lifting a trailer bar to the trailer bar attachment on the tractor by using the lifting actuators on the existing three-point attachment.

Figure 1:
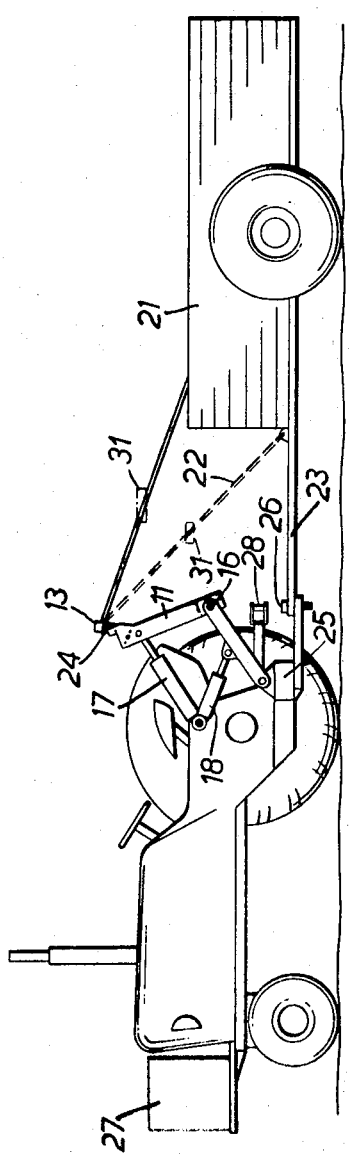
Figure 2:
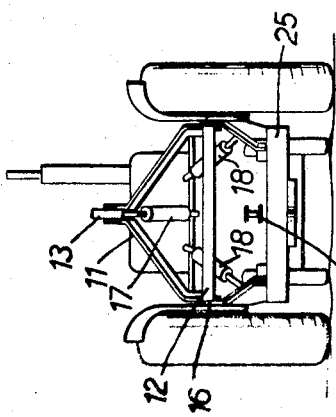

The invention may be carried into practice in various ways and one attachment for attaching an agricultural implement to a tractor for towing will now be described by way of example with reference to the accompanying drawings, of which:

FIG. 1 is an elevation of a tractor having an implement attached to it through the attachment; and FIG. 2 is a rear view of the tractor and attachment; and FIG. 3 is a detail of the attachment to a larger scale.

The bracket is in the form of an inverted Y-shaped assembly 11 of steel angle, the two forks of the Y being joined at their ends by a horizontal length 12 of steel angle. They have laterally spaced parallel portions which form the stem of the Y, between which portions a square steel tube 13 is received and is angularly secured relative thereto by a sector plate 14 fixed to the tube 13 and pivoted at 20 the parallel portions of the Y stem. A bolt is passed through a hole in the stem and one of a number of holes 15 in the plate which one can be selected in accordance with the desired angle of the stem to the vertical as seen from the side. The ends of the fork of the bracket are joined to the lower points 16 of the usual three-point attachment system of the tractor. The junction of the fork is joined to one end of a two-way ram 17, which replaces the usual upper attachment member. All the joints are pivotal joints.

In order to attach an implement 21 to the bracket a chain 22 is fastened to a towing bar 23 on the implement below the tube 13, as shown in phantom in FIG. 1 and a ring 24 on the other end of the chain is put over the up-standing tube 13 with the bracket in its lowered position, i.e. with the ram 17 and the ram 18 controlling the lower points 16 all extended. The hydraulic system of the tractor is operated to contract the rams and to raise the bracket until the towing bar is adjacent the towing plate 25 of the tractor, to which it is attached by means of a towing pin 26.

The chain 22 is then detached from the towing bar 23 and attached to some other point on the implement itself further from the tractor and displaced from the towing bar as shown in solid lines in FIG. 1. The ram 17 is contracted to turn the bracket anti-clockwise as seen in FIG. 1 and lift the implement and pull it nearer the tractor. This applies much of the weight of the implement to the tractor's rear axle through the chain and hydraulic system. It also causes the tractor to pivot clockwise so that the whole of its weight can be applied to the rear axle. The cumulative effect is to cause a much larger load to be applied to the rear axle of the tractor than if the trailer were merely attached to the towing plate 25. Under some circumstances it is possible that the towing ability of the tractor is as much as doubled. A load 27 could be applied to the front of the tractor to increase the effect.

Thus a tractor driving off the rear wheels only may be easily adapted to have a towing ability comparable with that of a tractor with four-wheel drive.

There is also the advantage that the trailer bar does not have to be lifted manually for attachment to the tractor, but that the hydraulic system can perform this task.

The bracket can also be used with devices requiring a power take-off, for example a baler, because the chain attachment is above the take-off connection 28.

If it is required to tow two or three implements on parallel courses to the trailer 21, a yoke 31 can be coupled to the chain a little behind the ring 24 and the implements can be coupled to chains coupled at points spaced along the yoke. The freedom of the yoke to turn enables the implements to be turned at the end of a line without fouling each other.

If the towing pin 26 should fail, the chain tension may tend to pull the tractor backwards, but the post 13 will be set to such an angle that the ring will come off before a dangerous angle is reached.

What I claim as my invention and desire to secure by Letters Patent is:

1. An attachment for coupling a trailer means to a tractor, having a rear axle drive, the attachment including a bracket swingably mounted on the tractor for coupling to the trailer means and an actuator coupled to swing the bracket to apply a lifting effect to the trailer means for causing the weight of the trailer to apply an increased load to the rear axle of the tractor, the bracket including a post and the attachment including a coupling comprising a ring for going over the post and a link for connecting the ring to the trailer means, and a transverse yoke on the link and attachment points at positions along the length of the yoke.

2. An attachment as claimed in claim 1 in which the bracket is pivotally mounted at its lower end to the tractor.

3. An attachment as claimed in claim 2 in which the tractor has standard attachment points, and the pivotal mounting at the lower end of the bracket is to at least one attachment point of the tractor.

4. An attachment for coupling trailer means to a tractor having rear wheels and a rear axle drive, the attachment including a bracket which extends generally vertically and is mounted at the rear of the tractor to pivot at its lower end about a horizontal axis transverse to the tractor, the bracket having a hitching point at its upper end which is above the top of the rear wheels of the tractor, an actuator coupled between the tractor and the bracket for pivoting the top of the bracket forwardly to apply a lifting effect to the trailer means, a towing bar connected independently of the bracket as a strut between the trailer means and the tractor, and a coupling linked to the hitching point and to a point at the trailer means above the towing bar.

5. An attachment as claimed in claim 4 in which the bracket includes a post, and the coupling comprises a ring for going over the post and a link for connecting the ring to the trailer means.

6. An attachment as claimed in claim 5 in which the post is pivotally connected to the remainder of the bracket and including means for locating the remainder of the bracket and post together in a selected position of relative pivoting.

7. An attachment as claimed in claim 5 in which the bracket is in the form of an inverted Y.

8. An attachment as claimed in claim 4 in which the bracket has an epstanding post at its top.

9. An attachment as claimed in claim 4 in which the tractor has a three point attachment system comprising two lower points and one upper point and the lower end of the bracket is in the form of a fork having arms respectively pivoted to the two lower attachment points.

10. An attachment for coupling a number of trailers to a tractor having a rear axle drive, the attachment including a bracket swingably mounted on the tractor and an actuator coupled between the tractor and the bracket for pulling the top of the bracket forwardly to apply a lifting effect to the trailer, a towing bar connected between one trailer and the tractor to maintain them spaced apart at a level below the top of said bracket, a link connected between the top of the bracket and said one trailer and a yoke on the link near the top of the bracket, and a coupling between the yoke and a point on each trailer above the towing bar.

* * * * *

UNITED STATES PATENT OFFICE
CERTIFICATE OF CORRECTION

Patent No. 3,679,230      Dated July 25, 1972

Inventor(s) David John FARRANT

It is certified that error appears in the above-identified patent and that said Letters Patent are hereby corrected as shown below:

In the Heading of the Patent insert:

"Claims priority application Great Britain December 13, 1968, 59462/68."

Signed and sealed this 24th day of April 1973.

(SEAL)
Attest:

EDWARD M. FLETCHER, JR.
Attesting Officer

ROBERT GOTTSCHALK
Commissioner of Patents